US012446918B2

(12) United States Patent
Ryo et al.

(10) Patent No.: US 12,446,918 B2
(45) Date of Patent: Oct. 21, 2025

(54) PRESSURE RELEASE CANNULA

(71) Applicant: Conmed Corporation, Utica, NY (US)

(72) Inventors: Isshiki Ryo, Largo, FL (US); Alan Hernandez, Odessa, FL (US)

(73) Assignee: Conmed Corporation, Utica, NY (US)

( * ) Notice: Subject to any disclaimer, the term of this patent is extended or adjusted under 35 U.S.C. 154(b) by 748 days.

(21) Appl. No.: 17/255,173

(22) PCT Filed: Jun. 25, 2019

(86) PCT No.: PCT/US2019/038917
§ 371 (c)(1),
(2) Date: Dec. 22, 2020

(87) PCT Pub. No.: WO2020/005896
PCT Pub. Date: Jan. 2, 2020

(65) Prior Publication Data
US 2021/0267631 A1   Sep. 2, 2021

Related U.S. Application Data

(60) Provisional application No. 62/838,443, filed on Apr. 25, 2019, provisional application No. 62/690,079, filed on Jun. 26, 2018.

(51) Int. Cl.
*A61B 17/34* (2006.01)
(52) U.S. Cl.
CPC .. *A61B 17/3423* (2013.01); *A61B 2017/3458* (2013.01); *A61B 2017/349* (2013.01)
(58) Field of Classification Search
CPC ............................ A61B 17/3421–3439; A61B 2017/3441–3449
See application file for complete search history.

(56) References Cited

U.S. PATENT DOCUMENTS 5,743,884 A * 4/1998 Hasson ............. A61B 17/3462
604/249
6,053,861 A    4/2000 Grossi
(Continued)

FOREIGN PATENT DOCUMENTS

CN    203777015 U    8/2014
EP    2275041        1/2011
(Continued)

OTHER PUBLICATIONS

AU 2nd exam report, App. No. 2019294490, dated Apr. 14, 2022, pp. 1-3.
(Continued)

*Primary Examiner* — Eduardo C Robert
*Assistant Examiner* — Steven J Cotroneo
(74) *Attorney, Agent, or Firm* — Bond, Schoeneck & King, PLLC; Frederick J.M. Price

(57) ABSTRACT

A pressure relief device for controlling the outflow of fluid from a surgical site. The pressure relief device includes a cannula body having a proximal end and a distal end with a thread extending along the entire cannula body from the distal end. The device also has a proximal end cap connected to the proximal end of the cannula body, a spacer connected between the cannula body and the proximal end cap, and a proximal seal enclosed between the proximal end cap and the spacer. One or more distal seals can be enclosed between the spacer and the proximal end of the cannula body. The device additionally includes a channel between the spacer and an inner wall of the proximal end cap. Fluid flows out of the device through the channel.

16 Claims, 12 Drawing Sheets

(56) References Cited

U.S. PATENT DOCUMENTS

| | | | |
|---|---|---|---|
| 8,029,475 B2* | 10/2011 | Franer | A61B 17/3462 604/167.01 |
| 8,038,652 B2 | 10/2011 | Morrison et al. | |
| 8,092,431 B2 | 1/2012 | Lunn et al. | |
| 8,109,910 B2* | 2/2012 | Zastawny | A61B 17/3462 604/167.02 |
| 8,961,407 B2* | 2/2015 | Piskun | A61B 17/3462 600/204 |
| 9,089,363 B2* | 7/2015 | Dooney, Jr. | A61B 17/3423 |
| 9,131,958 B2 | 9/2015 | Lunn et al. | |
| 9,592,077 B2 | 3/2017 | Yi | |
| 10,092,319 B2* | 10/2018 | Stearns | A61M 13/003 |
| 10,117,674 B2* | 11/2018 | Blinman | A61B 17/3421 |
| 10,350,384 B2 | 7/2019 | Farnan et al. | |
| 11,284,881 B2* | 3/2022 | Hess | A61B 17/0469 |
| 11,712,150 B2* | 8/2023 | Smith | A61B 1/00147 606/139 |
| 2005/0070946 A1 | 3/2005 | Franer et al. | |
| 2006/0217665 A1* | 9/2006 | Prosek | A61B 17/3462 604/167.02 |
| 2008/0294123 A1 | 11/2008 | Lunn et al. | |
| 2009/0137943 A1* | 5/2009 | Stearns | A61B 17/3421 604/167.03 |
| 2009/0270818 A1 | 10/2009 | Duke | |
| 2011/0144447 A1 | 6/2011 | Schleitweiler et al. | |
| 2013/0060084 A1* | 3/2013 | Fouts | A61B 17/3421 600/106 |
| 2014/0121630 A1 | 5/2014 | Dooney et al. | |
| 2014/0206942 A1 | 7/2014 | Webb | |
| 2014/0277195 A1* | 9/2014 | McBride | A61B 17/7089 606/86 A |
| 2014/0371681 A1* | 12/2014 | Yi | A61B 17/3462 604/523 |
| 2015/0065808 A1* | 3/2015 | Van Wyk | A61B 17/3462 600/201 |
| 2018/0271508 A1* | 9/2018 | Berti | A61B 17/0218 |
| 2021/0228233 A1* | 7/2021 | Pilletere | A61B 17/3423 |
| 2022/0054164 A1* | 2/2022 | Isshiki | A61B 17/3496 |

FOREIGN PATENT DOCUMENTS

| | | |
|---|---|---|
| EP | 2724678 | 4/2014 |
| JP | 2009261948 A | 11/2009 |
| WO | 2010042204 | 4/2010 |

OTHER PUBLICATIONS

International Search Report Form PCT/ISA/220, International Application No. PCT/US2019/038917, pp. 1-11, Dated Aug. 12, 2019.
KR Notice of Preliminary Rejection, Application No. 10-2021-7000793, dated Jul. 31, 2023, pp. 1-6.
Translated Chinese First Notice of Examination Action, App. No. 201980048590.6, dated Feb. 1, 2024, pp. 1-16.
"JP Office Action, Application No. 2023-084550, dated May 7, 2024, entire document".

* cited by examiner

PRESSURE RELEASE CANNULA

CROSS-REFERENCE TO RELATED APPLICATIONS

This application claims priority to U.S. Provisional Patent Application Ser. No. 62/690,079, filed on Jun. 26, 2018 and entitled "Cannula with Pressure Relief Mechanism," and U.S. Provisional Patent Application Ser. No. 62/838,443 filed on Apr. 25, 2019 and entitled "Splashless Cannula."

BACKGROUND OF THE INVENTION

1. Field of the Invention

The present invention is directed generally to a surgical device and, more particularly, to a pressure relief device for controlling the outflow of fluid from a surgical site.

2. Description of Related Art

Cannulas are used to support arthroscopic or endoscopic procedures by providing access to portals to the surgical site. Due to issues of fluid management, cannulas are often equipped with a seal at the proximal end. The seal limits fluid flow through the cannula, but may also contribute to the development of fluid pressure. Disturbing the seal by passing instruments or devices through the cannula may lead to spontaneous and uncontrolled projectile fluid leaks.

Therefore, there is a need for a device for controlling the outflow of fluid from a surgical site when passing instruments to the surgical site.

Description of the Related Art Section Disclaimer: To the extent that specific patents/publications/products are discussed above in this Description of the Related Art Section or elsewhere in this disclosure, these discussions should not be taken as an admission that the discussed patents/publications/products are prior art for patent law purposes. For example, some or all of the discussed patents/publications/products may not be sufficiently early in time, may not reflect subject matter developed early enough in time and/or may not be sufficiently enabling so as to amount to prior art for patent law purposes. To the extent that specific patents/publications/products are discussed above in this Description of the Related Art Section and/or throughout the application, the descriptions/disclosures of which are all hereby incorporated by reference into this document in their respective entirety(ies).

SUMMARY OF THE INVENTION

Embodiments of the present invention are directed to a pressure relief device for controlling the outflow of fluid from a surgical site. According to one aspect, the present invention is a pressure relief device including a cannula body having a proximal end and a distal end with a thread extending along at least a portion of the cannula body from the distal end toward the proximal end thereof. The device also includes a proximal end cap connected to the proximal end of the cannula body and a chamber connected between the cannula body and the proximal end cap. The device additionally has a proximal seal enclosed between the proximal end cap and the chamber and a first distal seal enclosed between the chamber and the proximal end of the cannula body.

According to another aspect, the pressure relief device includes a cannula body having a proximal end and a distal end with a thread extending along the entire cannula body from the distal end toward the proximal end thereof. The device also has a proximal end cap connected to the proximal end of the cannula body, a spacer connected between the cannula body and the proximal end cap, and a proximal seal enclosed between the proximal end cap and the spacer. One or more distal seals are enclosed between the spacer and the proximal end of the cannula body.

These and other aspects of the invention will be apparent from and elucidated with reference to the embodiment(s) described hereinafter.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following description taken in conjunction with the accompanying drawings in which:

DETAILED DESCRIPTION OF THE INVENTION

Aspects of the present invention and certain features, advantages, and details thereof, are explained more fully below with reference to the non-limiting examples illustrated in the accompanying drawings. Descriptions of well-known structures are omitted so as not to unnecessarily obscure the invention in detail. It should be understood, however, that the detailed description and the specific non-limiting examples, while indicating aspects of the invention, are given by way of illustration only, and are not by way of limitation. Various substitutions, modifications, additions, and/or arrangements, within the spirit and/or scope of the underlying inventive concepts will be apparent to those skilled in the art from this disclosure.

Figure 1:
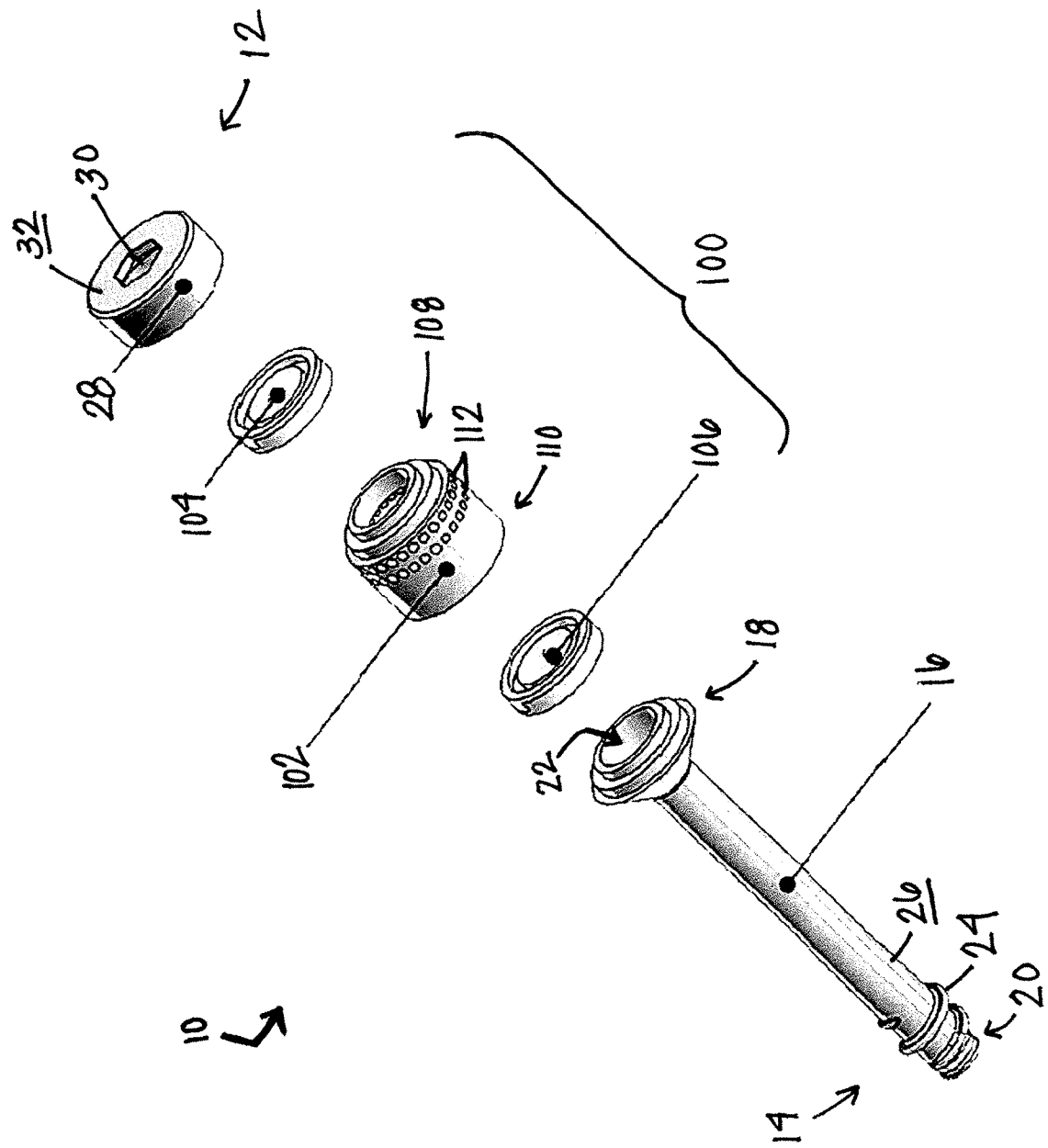
FIG. 1 is an exploded perspective view schematic representation of a pressure relief device, according to an embodiment.

Referring now to the figures, wherein like reference numerals refer to like parts throughout, FIG. 1 shows an exploded perspective view schematic representation of a pressure relief device 10, according to an embodiment. The pressure relief device 10 has a proximal end 12 and a distal end 14. The distal end 14 is configured for insertion into a portal at a surgical site. The distal end 14 includes a cannula body 16. The cannula body 16 is elongated and tubular, having an open proximal end 18 and an open distal end 20 with an inner volume 22 extending therebetween. The inner volume 22 is sized and configured to accommodate surgical instruments and devices. In the depicted embodiment, the distal end 20 of the cannula body 16 is threaded such that a thread 24 extends proximally along at least a portion of an exterior surface 26 of the cannula body 16 from its distal end 20, as shown. The thread 24 functions as a fixation feature for anchoring the device 10 at the surgical site.

The pressure relief device 10 additionally includes a pressure relief mechanism 100. In the embodiment shown in FIG. 1, the pressure relief mechanism 100 comprises a cylindrical chamber 102 with at least two water-tight seals, a proximal seal 104 and a distal (or "primary") seal 106. The proximal seal 104 is attached at a proximal end 108 of the chamber 102 and the distal seal 106 is attached a distal end 110 of the chamber 102. The distal seal 106, when undisturbed, functions as a conventional cannula seal, providing a barrier that limits fluid flow through the cannula body 16.

Still referring to FIG. 1, if the distal seal 106 is disturbed, the ensuing fluid leak will initially be introduced into the chamber 102 from the cannula body 16. The proximal seal 104 functions as a splash guard and is configured to prevent uncontrolled fluid leaks out of the proximal end 12 of the device 10. Any fluid from the leak will instead flow out of the chamber 102 and away from the user in a controlled manner. As shown in FIG. 1, the chamber 102 comprises a plurality of apertures 112 at its proximal end 108. The leaked fluid blocked by the proximal seal 104 flows out of the chamber 102 through the apertures 112. In the depicted embodiment, the apertures 112 are arranged in a pattern (but don't have to be), such as two substantially parallel rows of apertures 112.

Figure 2:
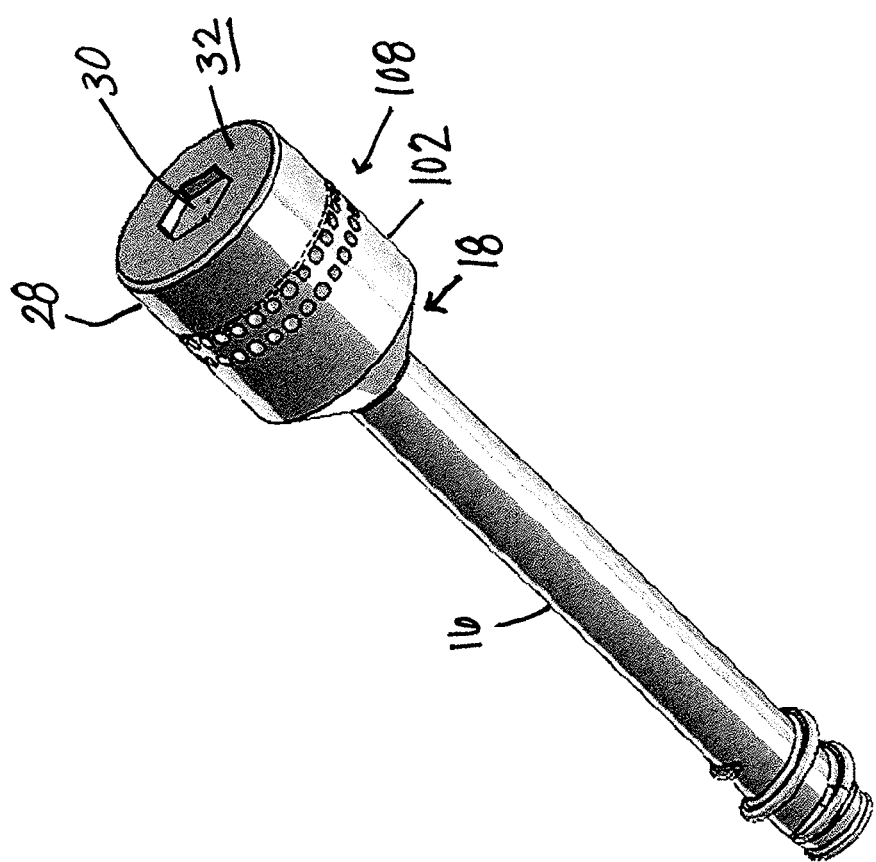
FIG. 2 is a perspective view schematic representation of the pressure relief device of FIG. 1.

As shown in FIG. 1, the proximal end 12 of the pressure relief device 10 additionally includes an end cap 28. The end cap 28 is cylindrical with a proximal surface 32 having a feature 30 therein, as shown in FIG. 2. In the embodiment depicted in FIG. 2, the feature 30 in the proximal surface 32 is a hexagon-shaped recess. The feature 30 is for connection to an installation or driving mechanism for rotating the device 10 into the desired position at the surgical site. As shown in FIG. 2, the end cap 28 mates with the proximal end 108 of the chamber 102, enclosing the proximal seal 104 therebetween. Further, the chamber 102 and the proximal end 18 of the cannula body 16 are connected, enclosing the distal seal 106 therebetween.

Figure 3:
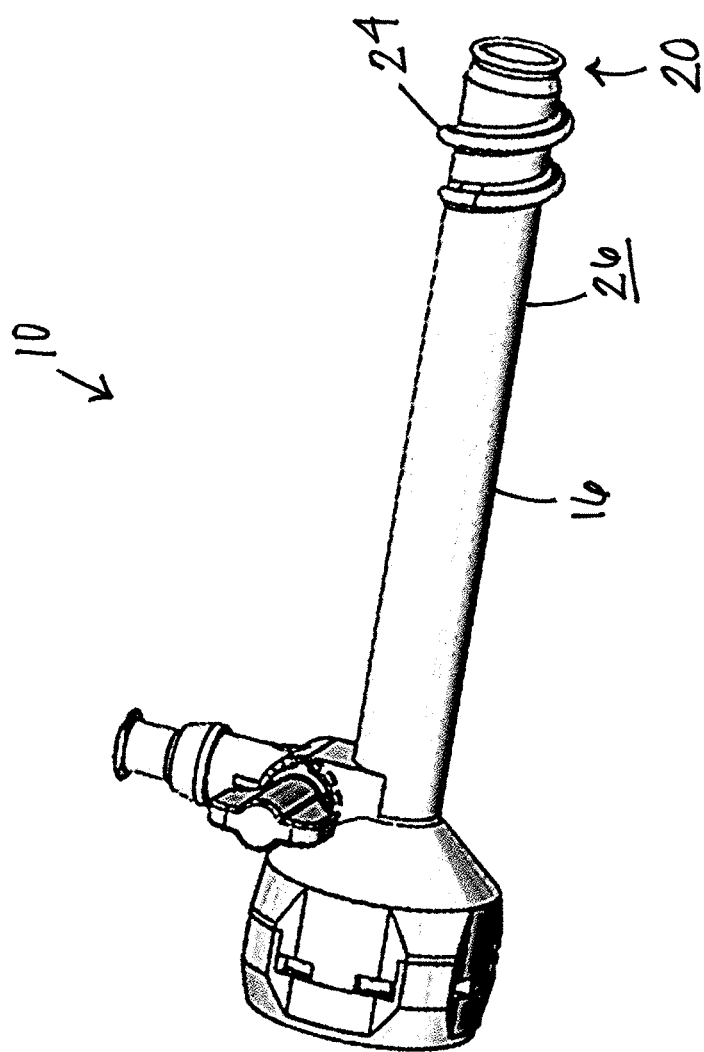
FIG. 3 is a side perspective view schematic representation of a pressure relief device, according to an alternative embodiment.
Figure 4:
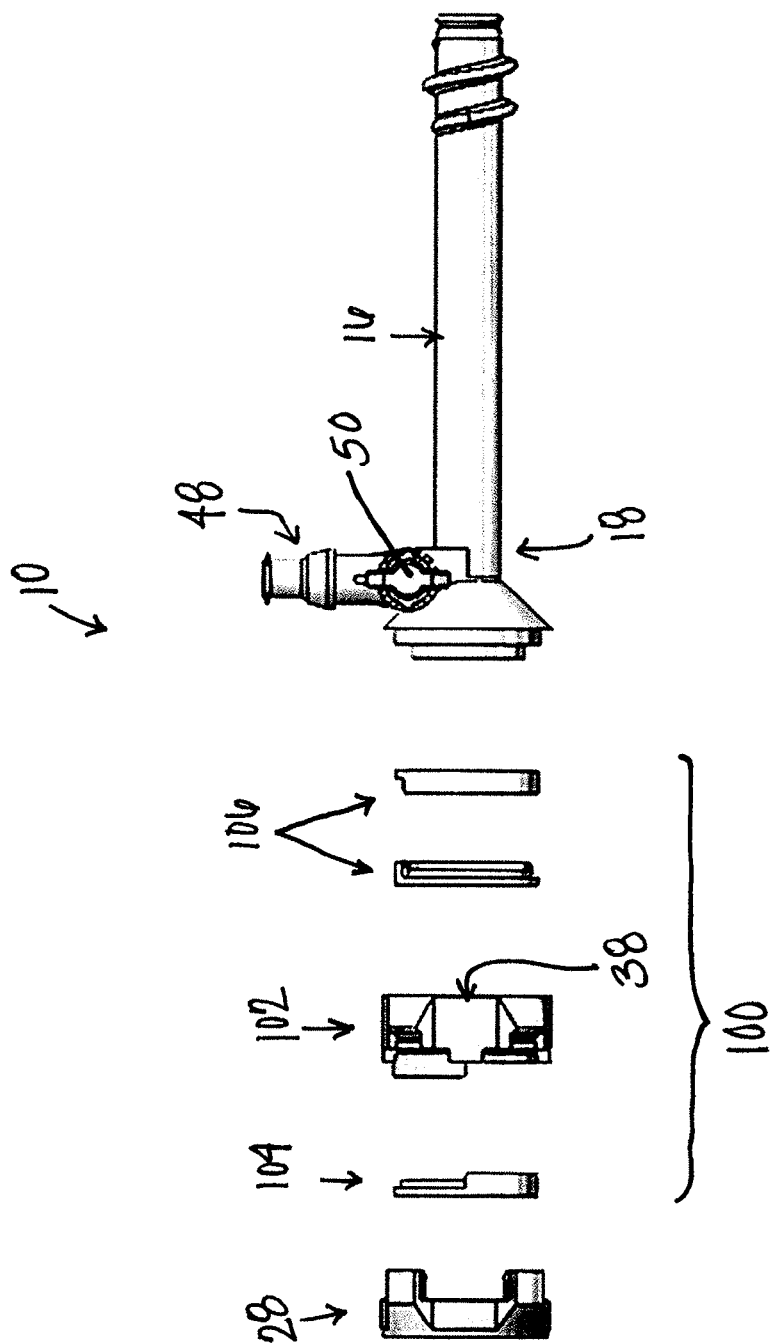
FIG. 4 is a side, partial exploded view schematic representation of the pressure relief device of FIG. 3.
Figure 5:
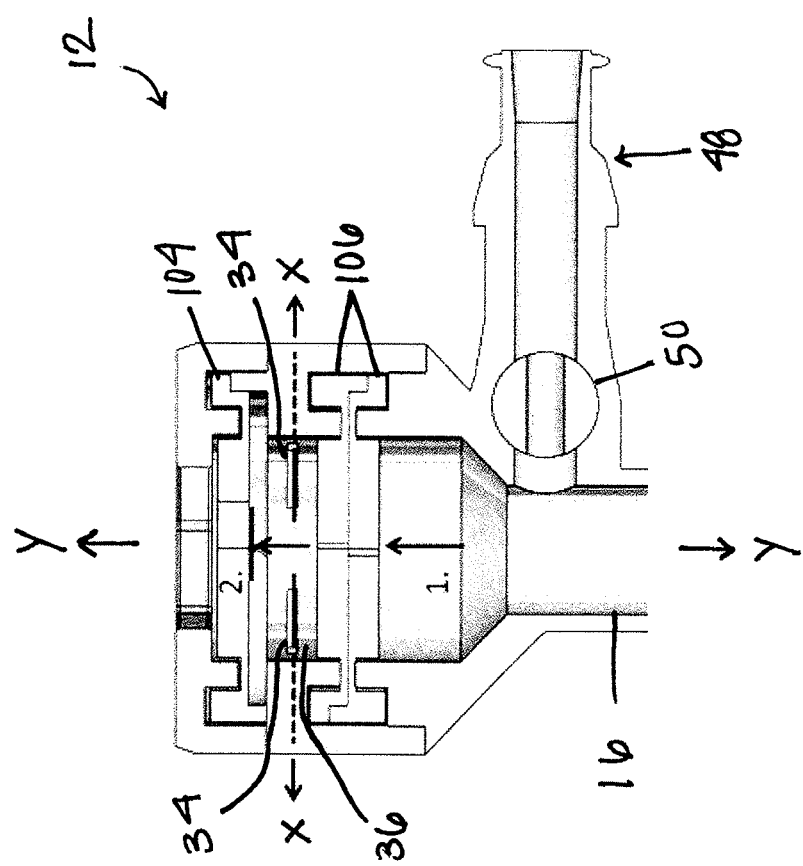
FIG. 5 is a partial cross-sectional view schematic representation of the proximal end of the pressure relief device of FIG. 3.
Figure 6:
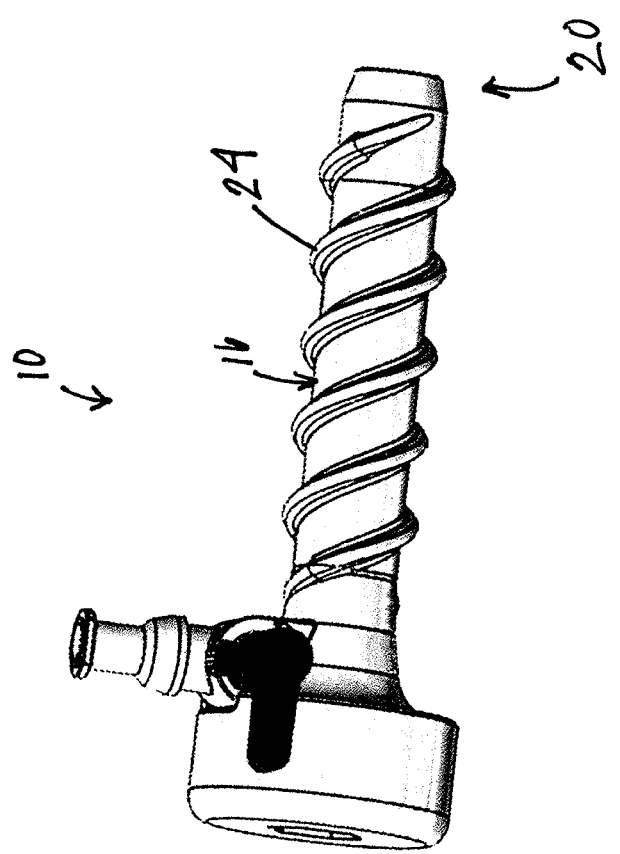
FIG. 6 is a side perspective view schematic representation of a pressure relief device, according to yet another embodiment.

Referring now to FIGS. 3-5, there are shown various views schematic representations of the pressure relief device 10, according to an alternative embodiment. FIG. 3 shows side perspective view of the pressure relief device 10. The device 10 in FIG. 3 comprises dual lead threads 24 along the exterior surface 26 of the cannula body 16 from its distal end 20. The dual lead threads 24 support a longer thread pitch while maintaining fixation strength so the cannula body 16 may be inserted in fewer turns.

As shown in FIG. 4, a partial exploded side view of the device is shown and includes a port 48 extending from the proximal end 18 of the cannula body 16. The port 48 provides an exit for the flow of fluid from the cannula body 16. The port 48 includes a control valve 50 for allowing or prohibiting the flow of fluid through the port 48. The device 10 in FIG. 4 also includes a pressure relief mechanism 100 having three seals: two primary (distal) seals 106 and a proximal seal 104. A chamber 102 (or "primary cap") separates the proximal seals 104 from the primary seals 106, as shown.

FIG. 5 shows a partial cross-sectional view schematic representation of the proximal end 12 of the device 10. As shown in FIG. 5, fluid flows from the distal end 20 (FIG. 3) of the cannula body 16 toward the primary seals 106 (pathway 1). Any projectile leakage bypassing the primary seals 106 is captured by the proximal seal 104 (pathway 2). The proximal seal 104 drastically reduces the amount of "splashing" experienced by the user. Over the course of use, a space 38 (FIG. 4) (i.e., recess or compartment) in the chamber 102 between the primary seals 106 and the proximal seal 104 fills with fluid.

The presence of fluid in the space 38 (FIG. 4) in the chamber 102 offers additional protection against projectile leakage. Any excess fluid will leak out from the chamber 102 and through the transverse slots 34 in an exterior wall 36 of the chamber 102, preventing fluid buildup between the seals 104, 106. The slots 34 are transverse to a central longitudinal y-y axis extending through the device 10 and the flow of fluid (pathways 1, 2) through the device 10. Specifically, the slots 34 extend in a direction along an x-x axis that is substantially perpendicular to the central longitudinal y-y axis and substantially parallel to the direction of the extension of the port 48.

Referring now to FIGS. 6-12, there are shown various views schematic representations of the pressure relief device 10, according to yet another embodiment. In the embodiment shown in FIG. 6, the cannula body 16 comprises dual lead threads 24 (can be single or multiple threads). The dual lead threads 24 start at the distal end 20 of the cannula body 16 and can (but don't have to) extend the entire length of the cannula body 16, as shown. The dual lead threads 24 support a longer thread pitch while maintaining fixation strength. This allows the cannula body 16 to be inserted in fewer turns compared to conventional cannulas.

Figure 7:
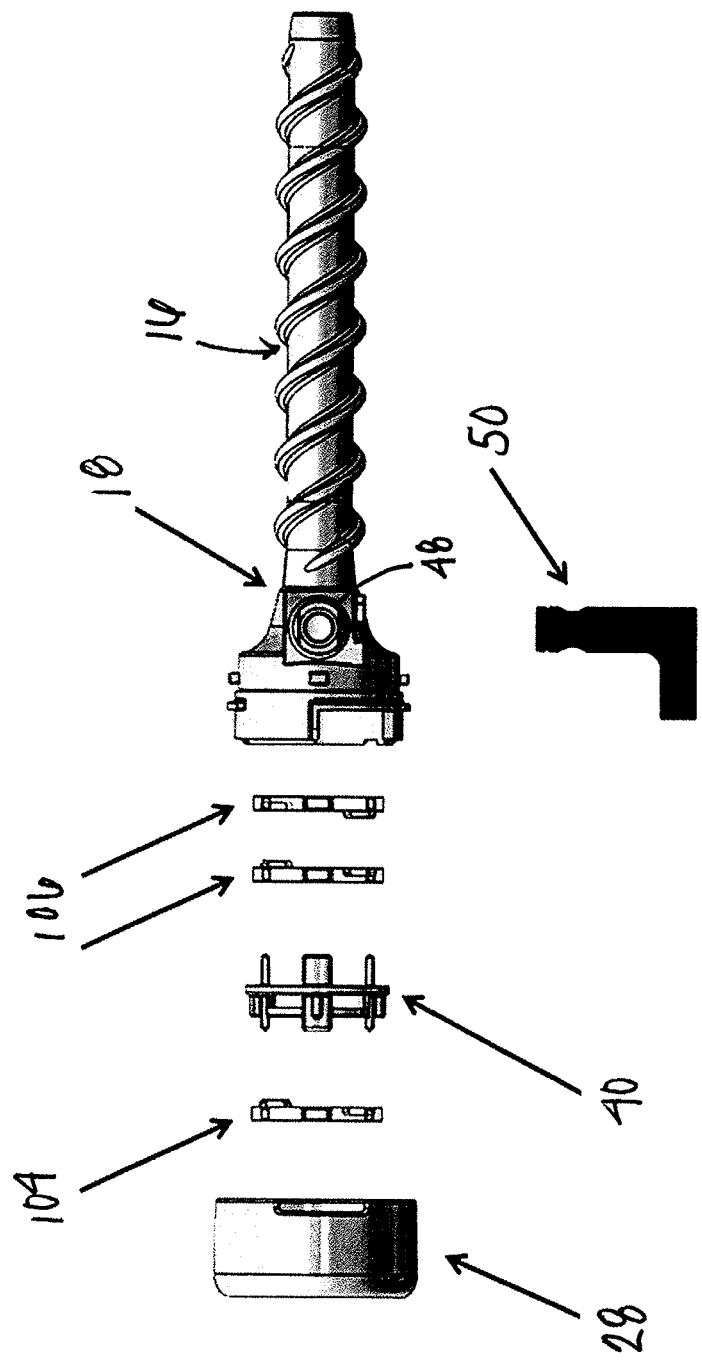
FIG. 7 is a side exploded view schematic representation of the pressure relief device of FIG. 6.
Figure 8:
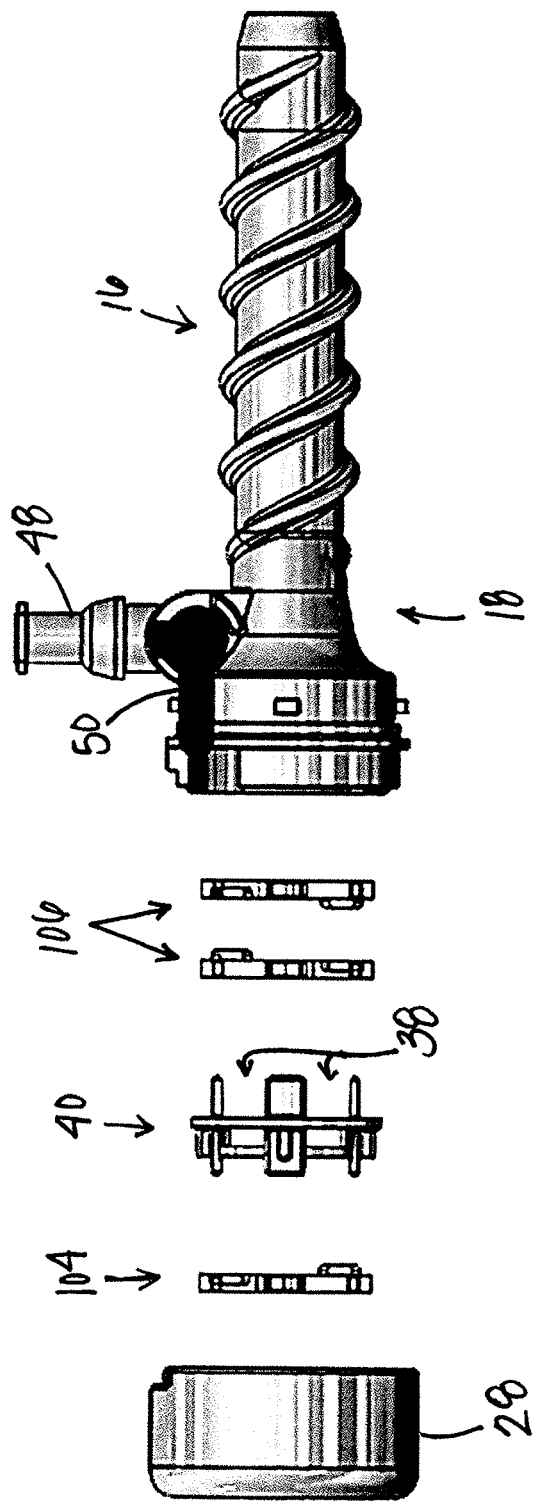
FIG. 8 is a side, partial exploded view schematic representation of the pressure relief device of FIG. 6.

Referring now to FIGS. 7-8, the device 10 includes a port 48 with a valve 50 for controlling the flow of fluid out of the device 10 similar to that in the embodiment of the device 10 of FIG. 5. As shown in FIG. 7, the valve 50 is an L-shaped petcock valve. The valve 50 is connected to the proximal end 18 of the cannula body 16, as shown in FIG. 8. The valve 50 can be rotatable between a first position and a second position. In the first position, the valve 50 restricts or otherwise prevents fluid flow from the cannula body 16 and in the second position, the valve 50 permits fluid flow from the cannula body 16. As also shown in FIGS. 7 and 8, the device 10 comprises a spacer 40 between a proximal seal 104 and two primary (distal) seals 106.

Figure 9:
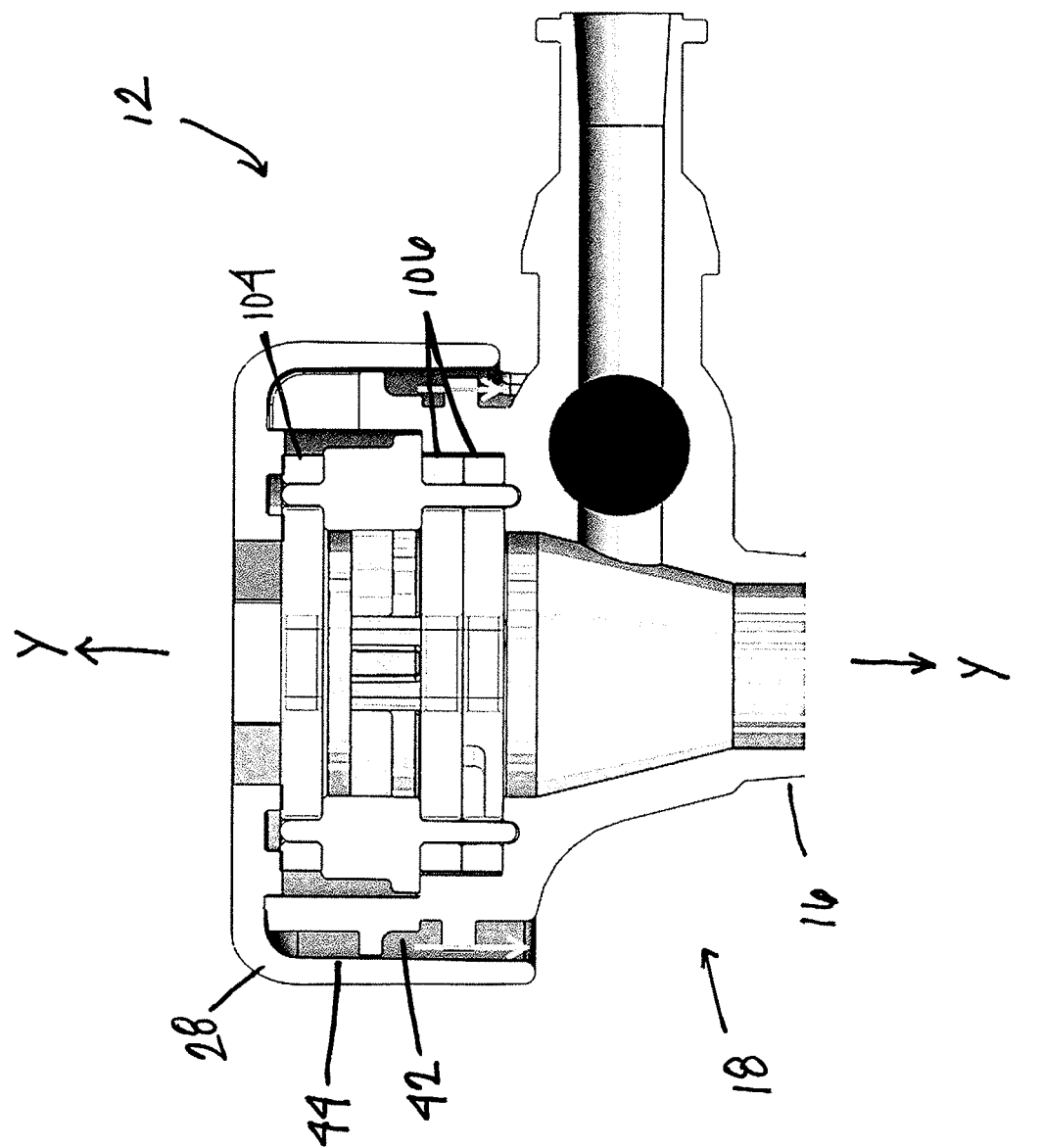
FIG. 9 is a partial cross-sectional view schematic representation of the proximal end of the pressure relief device of FIG. 6.
Figure 10:
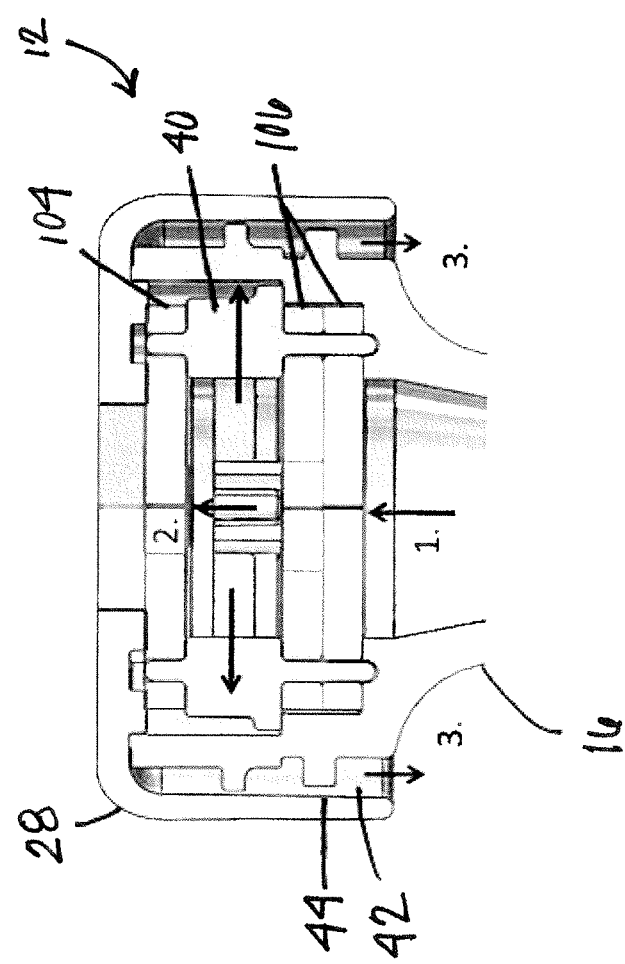
FIG. 10 is a partial cross-sectional view schematic representation of the end cap of the pressure relief device of FIG. 6.

Turning now to FIGS. 9-10, there are shown partial cross-sectional views schematic representations of the proximal end 12 of the device 10. As the device 10 is used, fluid flows through the cannula body 16 to the primary seals 106. Any projectile leakage is captured by the proximal seal 104, which drastically reduces the amount of "splashing" experienced by the user. Over the course of use, the space 38 (FIGS. 7-8) between the primary seals 106 and the proximal seal 104 becomes full of fluid. The presence of fluid between the seals 104, 106 offers further protection against projectile leakage. As shown in FIGS. 9-10, excess fluid leaks out from the chamber 102 through a channel 42 in an inner wall 44 of the chamber 102 (pathway 3), preventing fluid pressure buildup between the seals 104, 106. In the embodiment shown in FIG. 10, the channel 42 extends in a direction that is substantially parallel to the central longitudinal y-y axis.

Figure 11:
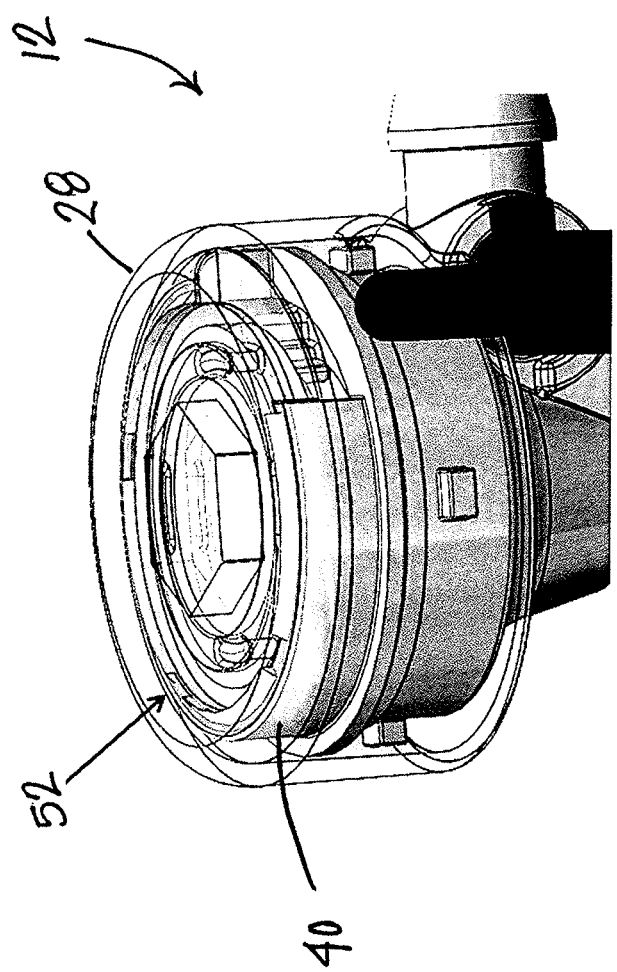
FIG. 11 is a top perspective view schematic representation of the end cap of the pressure relief device of FIG. 6.
Figure 12:
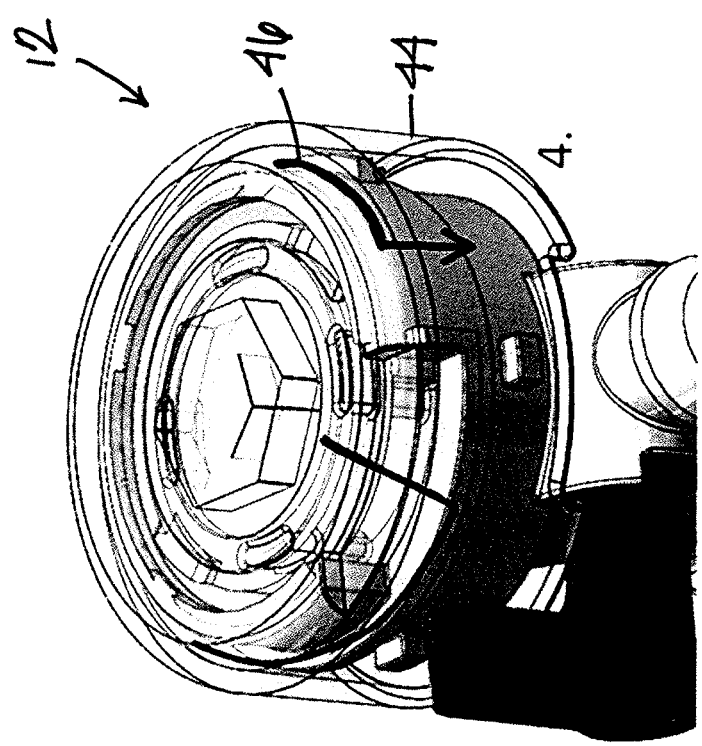
FIG. 12 is a top perspective view schematic representation of the end cap of the pressure relief device of FIG. 6.

Turning now to FIGS. 11-12, there are shown top perspective views schematic representations of the end cap 28 of the device 10. FIG. 11 shows the attachment sites 52 of the end cap 28 to the spacer 40. The structure of the end cap 28 is such that any excess fluid follows a path (pathway 4 in FIG. 12) around the end cap 28 of the device 10. Given the geometry of the fluid path 46 and structural design of the chamber 102, the chamber 102 can remain partially filled with fluid regardless of the orientation of the end cap 28. The excess fluid can then fall straight down along a side of the inner wall 44 of the chamber 102, away from the user.

All definitions, as defined and used herein, should be understood to control over dictionary definitions, definitions in documents incorporated by reference, and/or ordinary meanings of the defined terms.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as, "has" and "having"), "include" (and any form of include, such as "includes" and "including"), and "contain" (any form of contain, such as "contains" and "containing") are open-ended linking verbs. As a result, a method or device that "comprises", "has", "includes" or "contains" one or more steps or elements. Likewise, a step of method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts and equivalents of all means or step plus function elements in the claims below, if any, are intended to include any structure, material or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the present invention for various embodiments with various modifications as are suited to the particular use contemplated.

What is claimed is:

1. A pressure relief device, comprising:
    a cannula body having a proximal end and a distal end with a thread extending along at least a portion of the cannula body from the distal end toward the proximal end;
    a proximal end cap connected to the proximal end of the cannula body;
    a chamber connected between the cannula body and the proximal end cap, and having an outer surface forming a first portion of a most outer surface of the device around which forms a circumference of the most outer surface, wherein the first portion of the most outer surface comprises a plurality of apertures integrally formed with and extending around the circumference of the most outer surface of the chamber;
    a proximal seal enclosed between the proximal end cap and the chamber;
    a first distal seal and a second distal seal, wherein the first and second distal seals are stacked directly onto each other and enclosed between the chamber and the proximal end of the cannula body.

2. The device of claim 1, further comprising a port extending from the proximal end of the cannula body.

3. The device of claim 2, further comprising a valve rotatably connected to the port.

4. The device of claim 1, wherein the thread is a dual lead thread.

5. The device of claim 1, further comprising one or more transverse slots in the chamber.

6. The device of claim 5, wherein a central longitudinal axis extends through the device and the slots extend in a direction that is perpendicular to the central longitudinal axis.

7. The device of claim 1, further comprising a space within the chamber configured to receive fluid.

8. The device of claim 1, further comprising a geometric feature extending into a proximal surface of the proximal end cap.

9. A pressure relief device, comprising:
    a cannula body having a proximal end and a distal end with a thread extending along the entire cannula body from the distal end toward the proximal end;
    a proximal end cap connected to the proximal end of the cannula body;
    a spacer connected between the cannula body and the proximal end cap, and having an outer surface forming a first portion of a most outer surface of the device around which forms a circumference of the most outer surface, wherein the first portion of the most outer surface comprises a plurality of apertures integrally a formed with and extending around the circumference of the most outer surface of the spacer;

a proximal seal enclosed between the proximal end cap and the spacer;

first and second distal seals stacked directly onto each other and enclosed between the spacer and the proximal end of the cannula body.

10. The device of claim 9, further comprising a channel between the spacer and an inner wall of the proximal end cap.

11. The device of claim 10, wherein a central longitudinal axis extends through the device and the channel extends in a direction parallel to the central longitudinal axis.

12. The device of claim 9, further comprising a port extending from the proximal end of the cannula body.

13. The device of claim 12, wherein a central longitudinal axis extends through the device and the port extends in a direction perpendicular to the central longitudinal axis.

14. The device of claim 12, further comprising a valve rotatably connected to the port.

15. The device of claim 9, further comprising a geometric feature extending into a proximal surface of the proximal end cap.

16. The device of claim 9, wherein the thread is a dual lead thread.

* * * * *